United States Patent
Takatori et al.

(10) Patent No.: US 7,801,173 B2
(45) Date of Patent: Sep. 21, 2010

(54) COMMUNICATION MESSAGE CONVERSION APPARATUS AND COMMUNICATION MESSAGE CONVERSION METHOD

(75) Inventors: Tsuyoshi Takatori, Kobe (JP); Kaoru Noumi, Kobe (JP); Susumu Nishihashi, Kobe (JP); Tomohide Kasame, Kobe (JP); Yukio Ishikawa, Kobe (JP); Satoshi Fukui, Kobe (JP); Kokoro Hayashi, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 514 days.

(21) Appl. No.: 11/637,104

(22) Filed: Dec. 12, 2006

(65) Prior Publication Data

US 2007/0140294 A1    Jun. 21, 2007

(30) Foreign Application Priority Data

Dec. 20, 2005  (JP)  ............................. 2005-366347

(51) Int. Cl.
*H04J 3/16* (2006.01)

(52) U.S. Cl. ...................... 370/466; 370/469; 370/470; 370/474

(58) Field of Classification Search ................. 370/466, 370/465

See application file for complete search history.

(56) References Cited

U.S. PATENT DOCUMENTS

2005/0254518 A1* 11/2005 Fujimori ..................... 370/466

FOREIGN PATENT DOCUMENTS

| JP | A 04-107032 | 4/1992 |
| JP | A 2003-264576 | 9/2003 |
| JP | A 2005-216283 | 8/2005 |
| JP | A 2005-328119 | 11/2005 |
| KR | 10-2004-0035016 A | 4/2004 |

* cited by examiner

*Primary Examiner*—Jason E Mattis
*Assistant Examiner*—Kibrom T Hailu
(74) *Attorney, Agent, or Firm*—Oliff & Berridge PLC

(57) ABSTRACT

A communication conversion apparatus achieve efficient conversion without conversion delay and converts messages that effect communication with different communication protocols and schedules. In a message conversion apparatus that performs message conversion of different communication protocols, a routing circuit and a scheduler circuits that perform scheduling of the different communication protocols are separately provided. And time-triggered scheduling and event-triggered scheduling are separately performed. Conversion of FlexRay and CAN messages can be efficiently implemented.

2 Claims, 16 Drawing Sheets

FIG. 6

FLEXRAY COMMUNICATION CYCLE

| Cycle0 | Cycle1 | Cycle2 | Cycle3 | ...... |

FLEXRAY SLOTTED IMAGE

| Slot1 | Slot2 | Slot3 | Slot4 | ... | NIT |

FLEXRAY FRAME IMAGE

| FLEXRAY ID ETC. | DATA1 | DATA2 | DATA3 | ... | TRAILER SEGMENT |

CAN FRAME IMAGE

| CAN ID | DLC | DATA | ... |

$\underbrace{\phantom{DATA...}}_{\text{8byte}}$

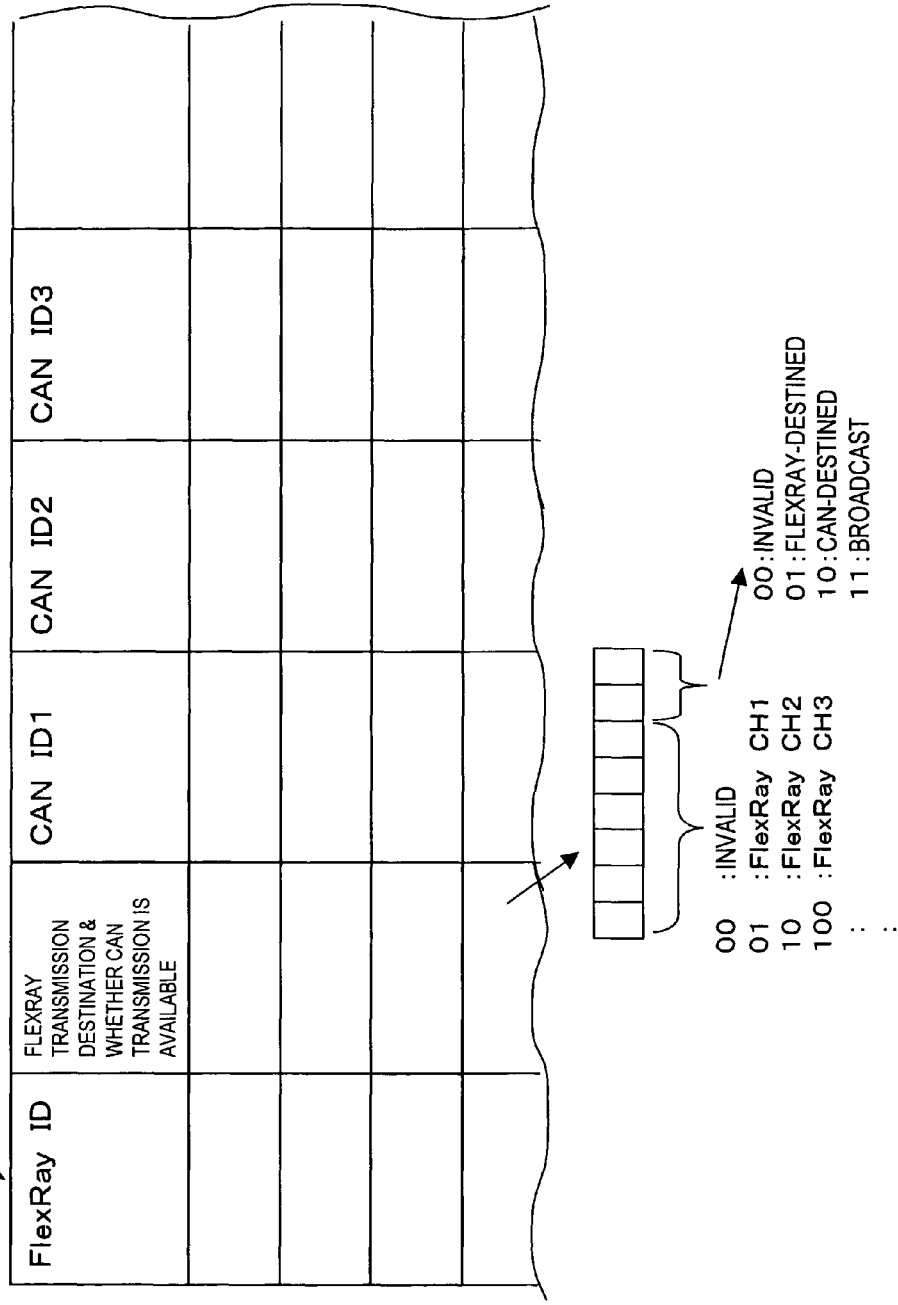

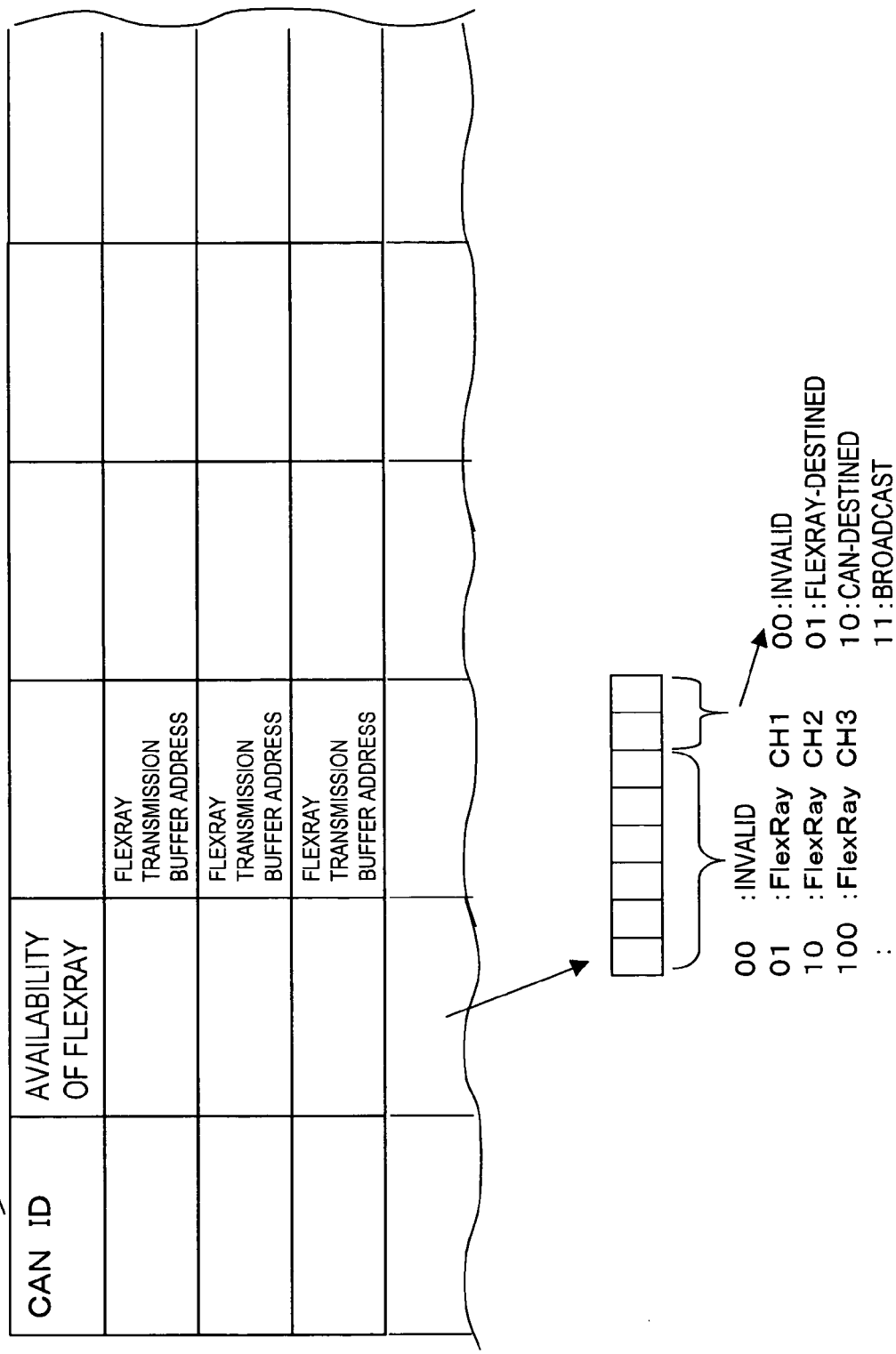

FIG. 10

| CAN ID | PERIODIC TRANSMISSION INTERVAL | WHETHER DECIMATION TRANSMISSION AVAILABLE | NUMBER OF TIMES OF DECIMATION | DECIMATION TIME | WHETHER OR NOT THE AVAILABILITY OF DECIMATION TRANSMISSION DEPENDS ON THE BUS LOAD | CAN CH BUFFER ADDRESS |
|---|---|---|---|---|---|---|
| .. | | | | | | |
| .. | | | | | | |
| .. | | | | | | |

34-1

TRANSMISSION INTERVAL
1 ~ * * (ms?)

0: NO DECIMATION
1: DECIMATION PERFORMED

NUMBER OF TIMES OF DECIMATION
1 ~ * * (TIMES)

DECIMATION TIME
1 ~ * * (ms?)

WHETHER OR NOT THE AVAILABILITY OF DECIMATION TRANSMISSION DEPENDS ON THE BUS LOAD
0: NO DECIMATION
1: DECIMATION PERFORMED

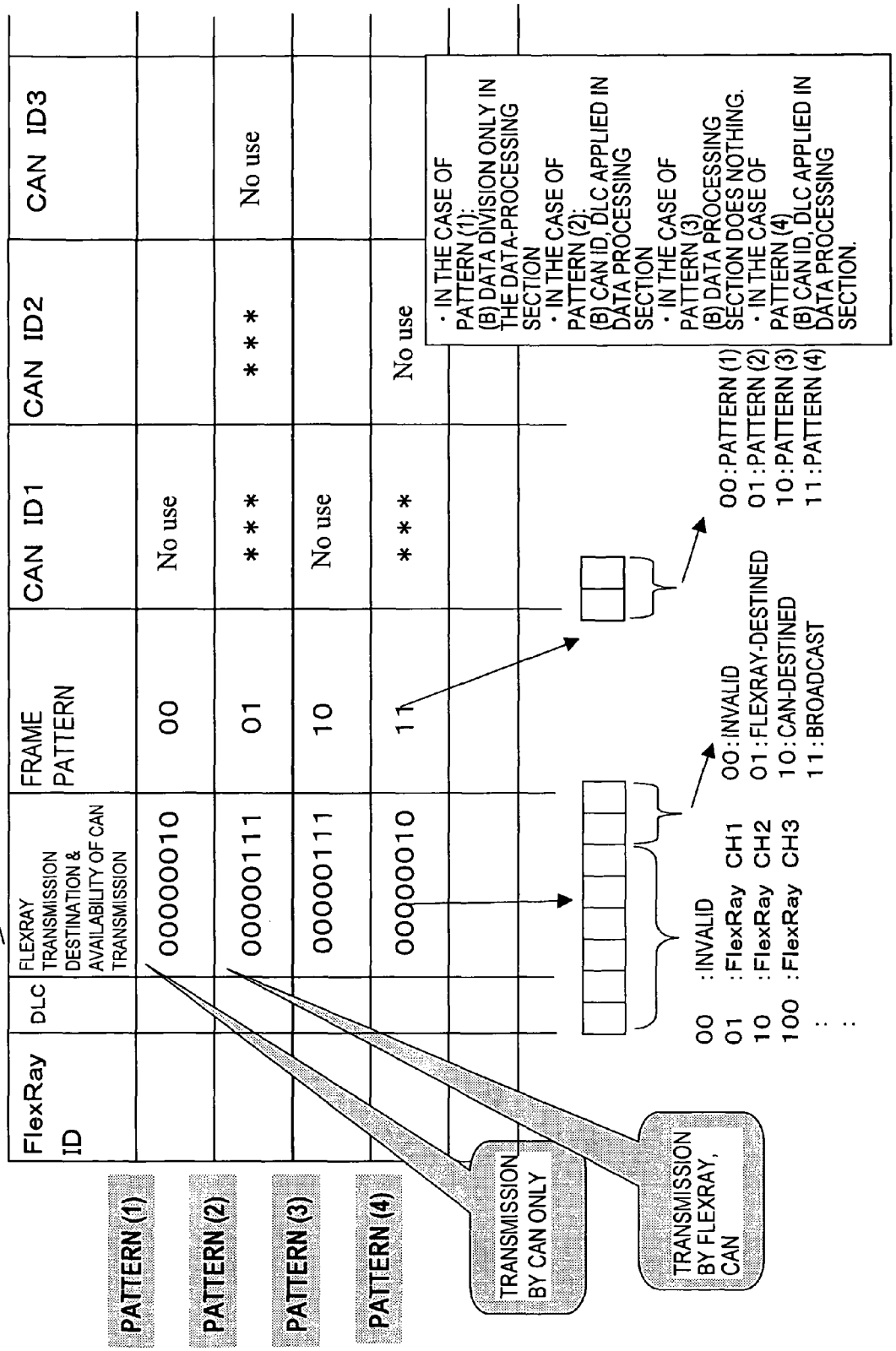

COMMUNICATION MESSAGE CONVERSION APPARATUS AND COMMUNICATION MESSAGE CONVERSION METHOD

CROSS-REFERENCE TO RELATED APPLICATIONS

This application is based upon and claims the benefit of priority from the prior Japanese Patent Application No. 2005-366347, filed on Dec. 20, 2005, the entire contents of which are incorporated herein by reference.

BACKGROUND OF THE INVENTION

1. Field of the Invention

The present invention relates to a communication message conversion apparatus and a communication message conversion method of converting messages between communication networks of different protocol, and in particular relates to a communication message conversion apparatus and a communication message conversion method suitable for message conversion between a FlexRay network (registered trademark of Daimler Chrysler AG) and a CAN (Controller Area Network).

2. Description of the Related Art

According to replacement an equipment mounted in vehicles to an electronic equipment, communication networks are also being constructed within vehicles. CANs (Controller Area Networks) are widely employed for such vehicle LANs (Local Area Networks) (see for example Laid-open Japanese Patent Application No. 2003-264576).

On the other hand, with increase in the amount of data and increased complexity, networks of higher speed and reliability are being demanded. For this purpose, attention has been focused on FlexRay® as a high-speed network. The maximum transfer rate of FlexRay is 10 Mbps, which is 10 times the 1 Mbps which is the maximum transfer rate of CAN.

Thus, in introduction of FlexRay, it has become necessary to consider communication with the previously employed CAN. Message conversion apparatus that can perform communication conversion between FlexRay and CAN has therefore been proposed (see for example Laid-open Japanese Patent Application No. 2005-328119 (FIG. 2)).

In this message conversion apparatus that has been proposed, a CPU (central processing unit) is provided between the FlexRay controller that is connected with the FlexRay network and the CAN controller that is connected with the CAN network. By software processing, this CPU converts messages from the CAN controller to FlexRay messages in accordance with the FlexRay protocol and transmits these to the FlexRay controller, and converts messages from the FlexRay controller to CAN messages in accordance with the CAN protocol, and transmits these to the CAN controller.

However, in the conventional message conversion apparatus, this function was implemented by software. Consequently, if the CPU was allocated processing functions apart from conversion processing and routing processing, the load on the CPU became large causing delay in conversion, making it difficult to utilize the high-speed transfer rate effectively. In particular, as the communication protocols of FlexRay and CAN are different, it is necessary to perform synchronous monitoring, error monitoring and error processing in a high priority, so it is inevitable increased on the CPU load.

Also, with regard to conversion processing and routing processing, when the number of FlexRay or CAN channels is increased, considerable time is required for channel retrieval at the relay destination, with the result that routing processing takes a considerable time. Furthermore, since there is an increase in the number of frames requiring conversion processing, the latency time in the conversion apparatus is increased, tending to have an adverse effect on throughput and making a large-capacity buffer memory necessary.

SUMMARY OF THE INVENTION

An object of the present invention is therefore to provide a message conversion apparatus and a message conversion method for converting messages of different communication protocol and relaying at high speed.

Also, a further object of the present invention is to provide message conversion apparatus and a message conversion method for efficiently converting messages of different communication protocol and relaying with high throughput.

Yet a further object of the present invention is to provide a message conversion apparatus and a message conversion method for preventing a lowering of throughput even though the number of channels is increased.

In order to achieve these objects, according to the present invention there is provided a communication message conversion apparatus connected with communication paths of different communication protocol, that converts a message of one communication protocol into a message of another protocol and that transmits the converted message to a specified address, having: a reception circuit that receives a message in the one communication protocol from a first communication path; a transmission circuit that transmits a message of another communication protocol, with the schedule of another communication protocol, to a second communication path; and a routing circuit that retrieves an address identifier of the communication path of another protocol from the identifier included in the message received by the reception circuit, and that converts the message received by the reception circuit to a format of another protocol.

Also, according to the present invention, a communication message conversion apparatus for converting a message of an event-triggered communication protocol to a message of a time-triggered communication protocol and transmitting converted message to a designated address has: a reception unit that receives a message of the event-triggered communication protocol; a transmission buffer that stores the time-triggered message; a transmission unit that transmits the message of the transmission buffer to a communication path with a time-triggered schedule; and a routing unit that stores the event-triggered message in a storage location at a designated address of the transmission buffer and stores updating history of the event-triggered message; wherein transmission is effected with the updating history attached to the event-triggered message.

In addition, according to the present invention, a communication message conversion apparatus for converting a message of an event-triggered communication protocol to a message of a time-triggered communication protocol and transmitting the converted message to a designated address has: a reception unit that receives a message of an event-triggered communication protocol; a transmission buffer that stores the time-triggered message; a transmission unit that, in accordance with network idle time information of the time-triggered communication network, transmits the message of the transmission buffer to a communication path with a time-triggered schedule; and a routing unit that stores the event-triggered message in a storage location at a designated address of the transmission buffer.

In addition, according to the present invention, a message conversion method for converting a FlexRay frame pattern to a CAN frame pattern has the steps of: receiving the FlexRay frame pattern constituted by an identifier indicating the CAN ID, data length and CAN data; and converting the FlexRay frame pattern to the CAN frame pattern by using an identifier indicating the CAN ID, data length and CAN data of the received FlexRay frame.

In addition, according to the present invention, a message conversion method for converting a FlexRay frame pattern to a CAN frame pattern has the steps of: receiving the FlexRay frame pattern constituted by an identifier indicating the FlexRay ID and CAN data; and converting the identifier of the received FlexRay frame to a CAN ID and converting to the CAN frame pattern by using CAN data wherein the data length is attached.

With the present invention, since a scheduling circuit that performs scheduling of different communication protocols and a routing circuit are separately provided, message conversion can be achieved at high speed without latency. Also, since the updating history is attached to the time-triggered message, devices that receive messages from the communication path can easily identify whether the message in question is an updated message or the preceding message, even in the case of time-triggered messages. Furthermore, since time-triggered scheduling is implemented triggered by the network idle time, conversion processing can be achieved in accordance with the time-triggered schedule accurately and easily. Furthermore, since the FlexRay frame format is constituted taking conversion efficiency into account, FlexRay and CAN message conversion can be achieved efficiently.

BRIEF DESCRIPTION OF THE DRAWINGS

FIG. 6 is a frame relationship diagram of FlexRay and CAN in FIG. 4;

FIG. 8 is a diagram of the FlexRay address map memory of FIG. 7;

FIG. 9 is a diagram of the CAN address map memory of FIG. 7;

FIG. 10 is a diagram of the CAN conversion map memory of FIG. 7;

FIG. 16 is a diagram of a FlexRay map memory for frame pattern conversion in FIG. 15 and FIG. 16.

DESCRIPTION OF THE PREFERRED EMBODIMENTS

An embodiment of the present invention is described below in the order: message conversion device, routing circuit, scheduling circuit, FlexRay-CAN conversion frame processing; and other embodiments. However, the present invention is not restricted to this embodiment.

—Message Conversion Device—

Figure 1:
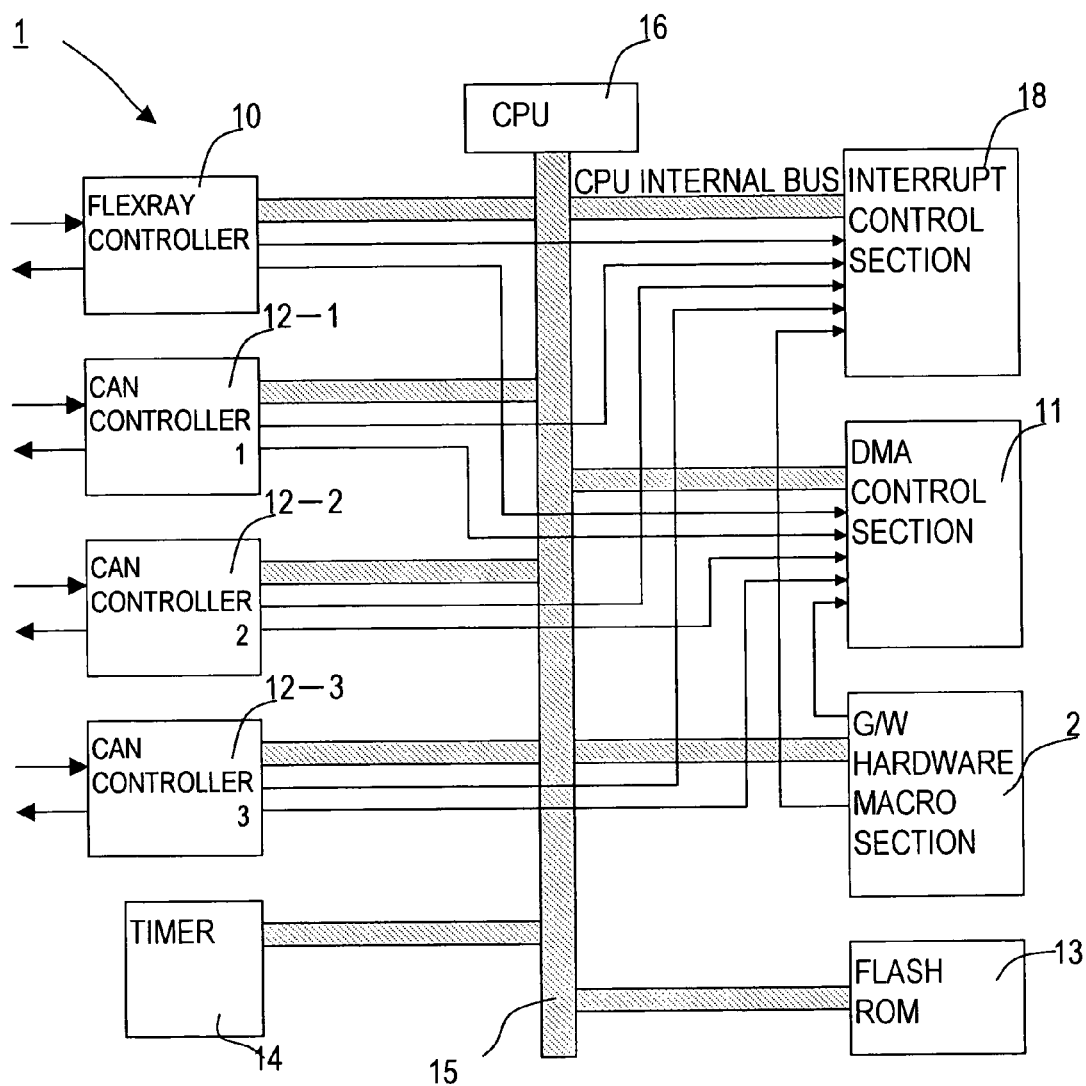
FIG. 1 is a block diagram of a communication message conversion apparatus according to an embodiment of the present invention.
Figure 2:
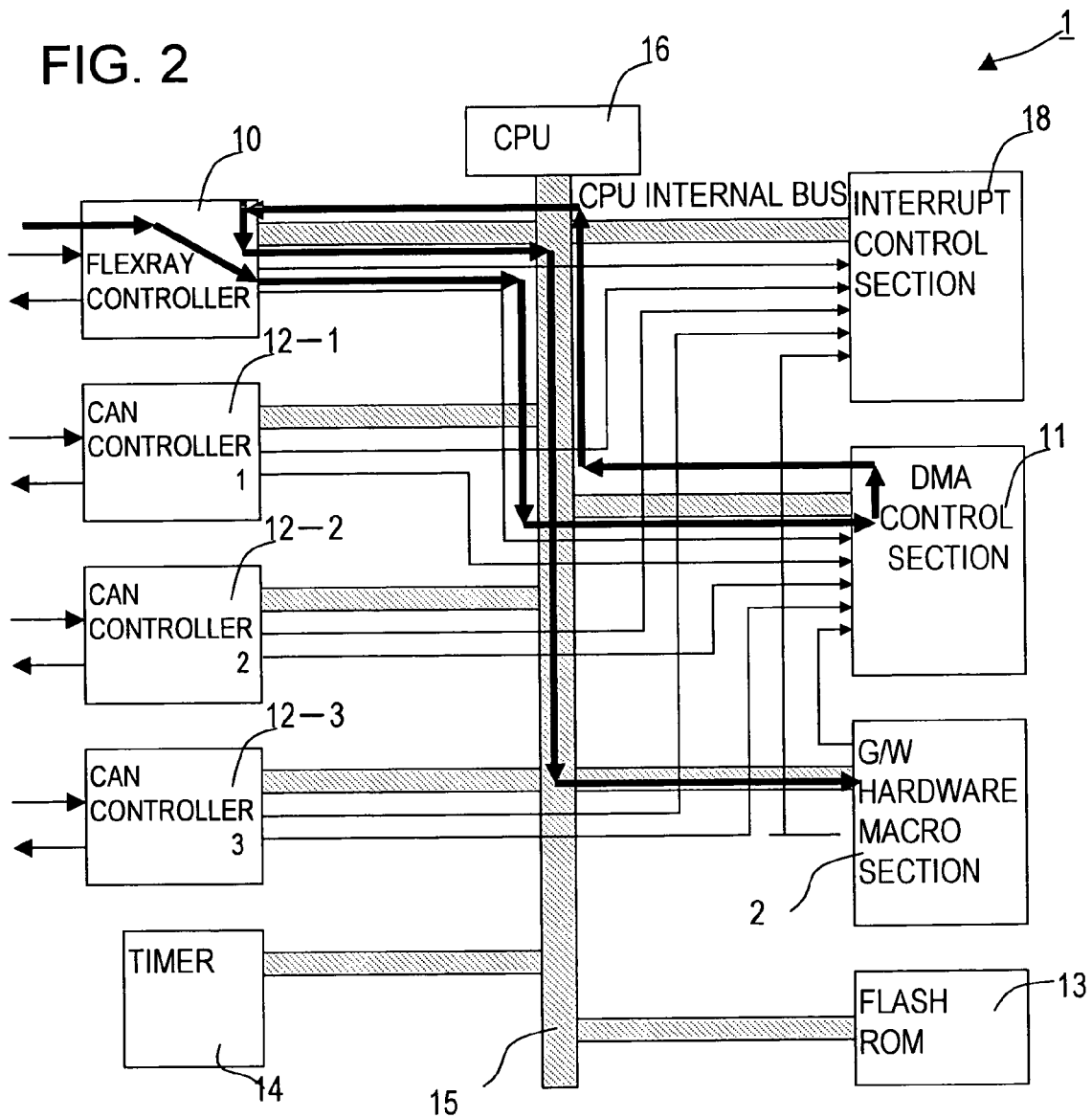
FIG. 2 is a diagram of FlexRay data receiving operation with the construction of FIG. 1.
Figure 3:
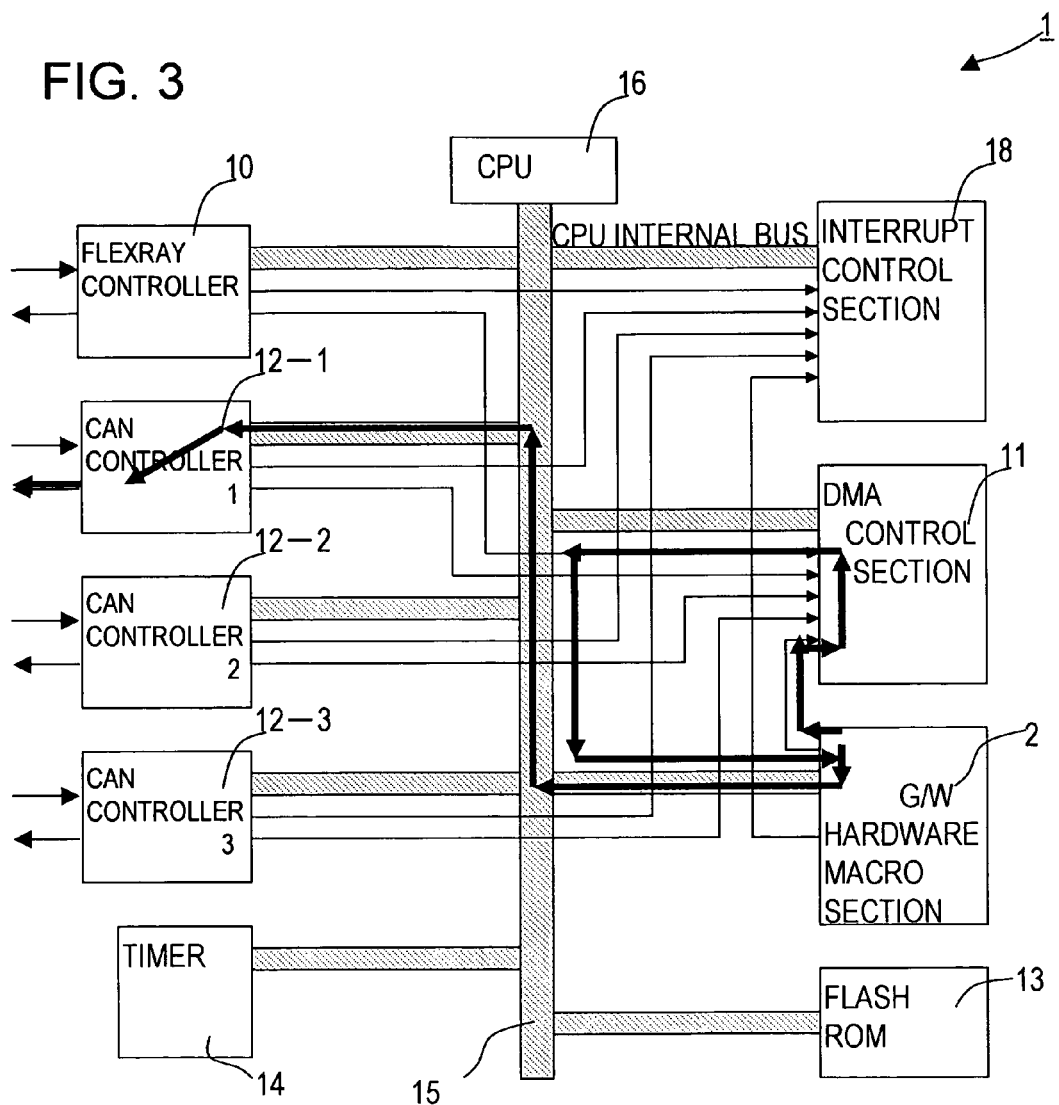
FIG. 3 is a diagram of CAN data transmission operation with the construction of FIG. 1.
Figure 4:
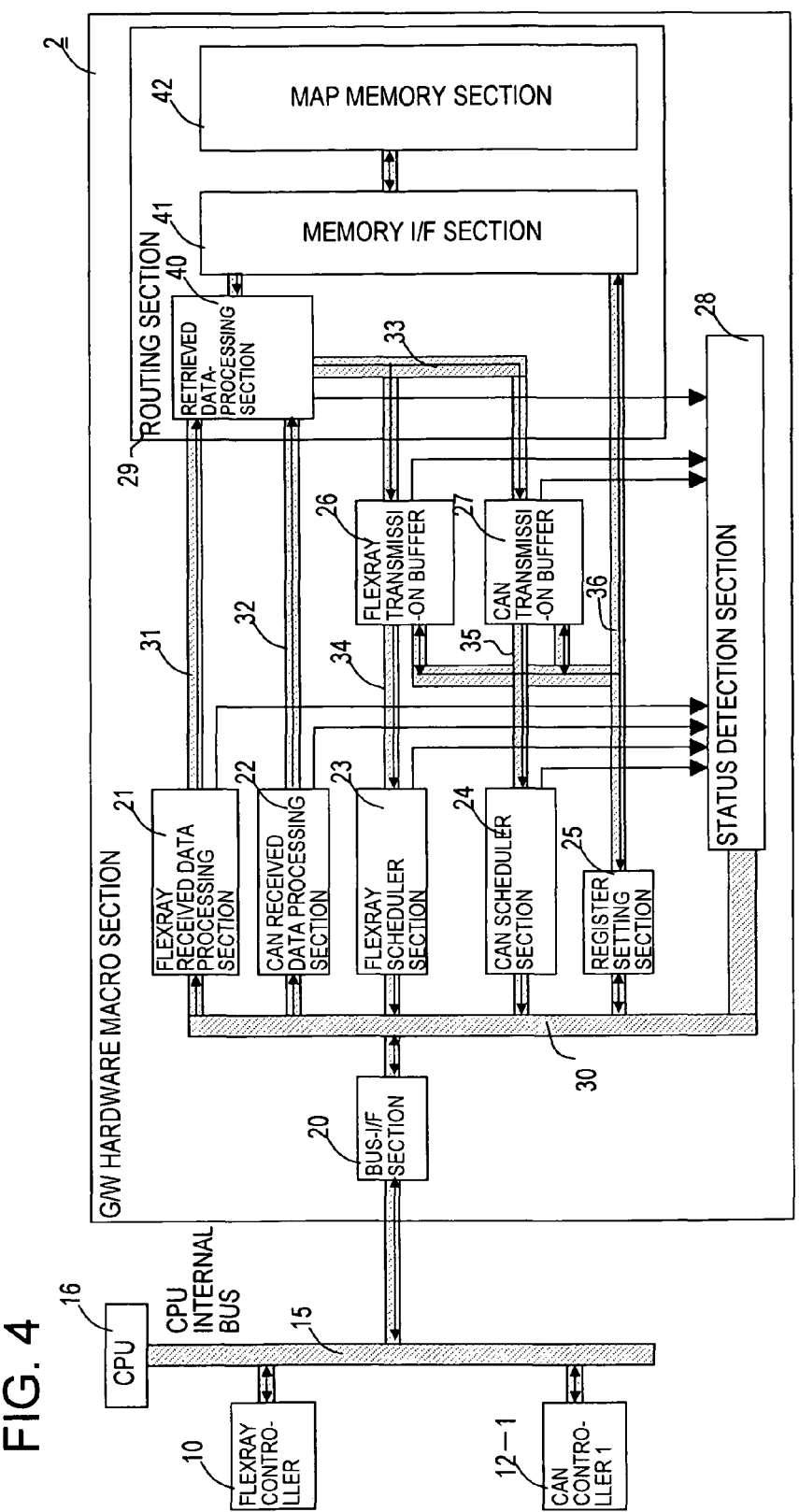
FIG. 4 is a constructional diagram of a G/W hardware macro unit of FIG. 1.
Figure 5:
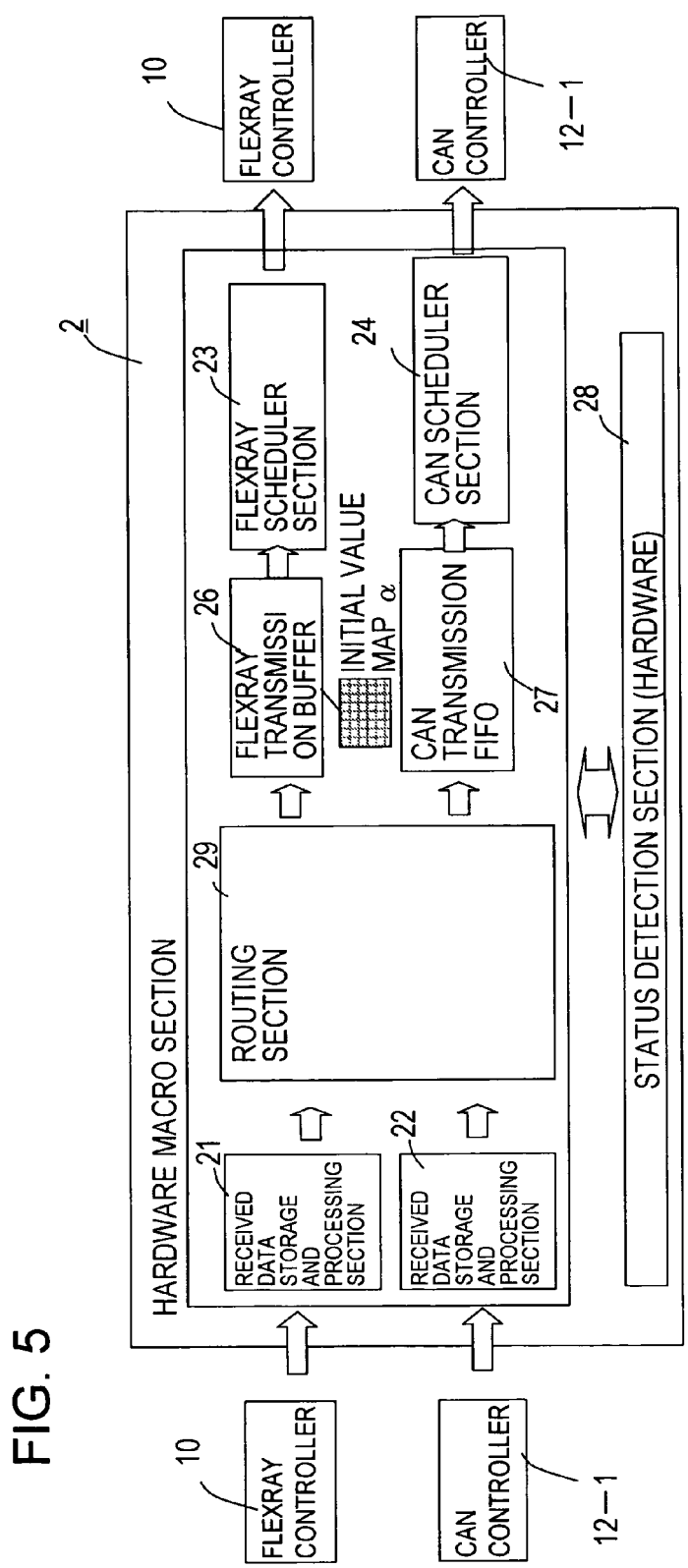
FIG. 5 is a block diagram of a G/W hardware macro unit of FIG. 4.

FIG. 1 is an overall block diagram of an embodiment of a message conversion device according to the present invention; FIG. 2 and FIG. 3 are routing operation diagrams of the message conversion device of FIG. 1; FIG. 4 is a block diagram of the G/W hardware macro circuit of FIG. 1; FIG. 5 is a diagram of the hardware macro circuit of FIG. 4; and FIG. 6 is a diagram of the FlexRay communication format and CAN communication format.

As shown in FIG. 1, a message conversion device 1 is constituted by: a FlexRay controller 10, a plurality (in this case, three) of CAN controllers 12-1, 12-2 and 12-3; a timer circuit 14; a CPU 16; an interrupt control circuit 18; a DMA (direct memory access) circuit 11; a G/W (gateway) hardware macro circuit 2; a flash memory 13 and an internal bus 15 connecting these.

The FlexRay controller 10 is a communication controller (CC) that controls communication and is connected with the FlexRay bus through a bus driver (not shown).

For FlexRay a time-triggered protocol in which frame transmission/reception is performed by time slots is adopted. Specifically, a periodic data transfer system is adopted in which the time slot that is employed by each node is predetermined.

For the CAN controllers 12-1, 12-2 and 12-3, a CSMA/CA transfer system is adopted, and CAN protocol is adopted in which message transmission can be performed when the transfer path is free. Specifically, this is an event-triggered protocol, in which transmission can be performed only when the right to transmit can be acquired by generating a communication request in association with occurrence of an event.

The interrupt control circuit 18 grants an exclusive right to the bus 15 by arbitrating interrupts from the FlexRay controller 10, CAN controllers 12-1, 12-2, 12-3 and G/W hardware macro circuit 2. The DMA control circuit 11 performs DMA transfer on receiving a DMA request from the FlexRay controller 10, CAN controllers 12-1, 12-2, 12-3 or G/W hardware macro circuit 2.

As described below with reference to FIG. 4 and the following figures, the G/W hardware macro circuit 2 performs conversion of the FlexRay protocol and CAN protocol and effects transfer to the designated address. The CPU 16 performs setting of for example the controllers 10, 12-1, 12-2 and 12-3, status monitoring, error detection and error processing. The flash ROM 13 mainly stores for example the program executed by the CPU 16 and parameters therefor.

FIG. 2 and FIG. 3 are diagrams of the gateway operation of the G/W hardware macro circuit 2 in the layout of FIG. 1; FIG. 2 is a diagram of the transmission operation from the FlexRay controller 10 to the G/W hardware macro circuit 2; and FIG. 3 is a diagram of the transmission operation from the G/W hardware macro circuit 2 in the construction of FIG. 1 to the CAN controller 12-1.

As shown in FIG. 2, when the FlexRay controller 10 receives FlexRay frame data (described below with reference to FIG. 7) from the FlexRay bus, the controller 10 notifies start of DMA request processing to the DMA control circuit 11 through the signal line. The DMA control circuit 11 permits the FlexRay controller 10 to perform DMA transfer, as a result of which the FlexRay controller 10 transmits the received FlexRay frame data to the G/W macro circuit 2 through the bus 15.

As will be described later, the G/W hardware macro circuit 2 converts the FlexRay frame data to the CAN frame data and transmits this data to the designated address (in this example, the CAN controller 12-1). Specifically, as shown in FIG. 3, the G/W hardware macro circuit 2 reports to the DMA control circuit 11 through the signal line commencement of processing of the DMA request. The DMA control circuit 11 enables DMA transfer in respect of the G/W hardware macro circuit 2 and the G/W hardware macro circuit 2 transmits the converted CAN frame data to the CAN controller 12-1 through the bus 15.

FIG. 4 is a block diagram of the G/W hardware macro circuit 2, FIG. 5 is a block diagram in which the layout of FIG. 4 is rewritten in accordance with the flow of signals, and FIG. 6 is a diagram of the FlexRay communication format and CAN communication format.

As shown in FIG. 4, the G/W hardware macro circuit 2 includes: a bus interface circuit 20 connected with the internal bus 15, a FlexRay received data processing circuit 21, a CAN received data processing circuit 22, a FlexRay scheduler circuit 23, a CAN scheduler circuit 24, a register setting section 25, a FlexRay transmission buffer 26, a CAN transmission buffer 27, a status detection circuit 28 and routing circuit 29.

The routing circuit 29 includes: a map memory 42 that stores the correspondence relationship of FlexRay ID and CAN ID, a retrieval data processing circuit 40 that retrieves the CAN ID corresponding to the FlexRay ID and the FlexRay frame buffer address corresponding to the CAN ID by utilizing the map memory 42, and a memory interface circuit 41.

The bus interface circuit 20 is connected by a bus 30 with the FlexRay received data processing circuit 21, CAN received data processing circuit 22, FlexRay scheduler circuit 23, CAN scheduler circuit 24 and register setting section 25. The routing circuit 29 is connected with the FlexRay received data processing circuit 21 by the bus 31, with the CAN received data processing circuit 22 by the bus 32, and with the FlexRay transmission buffer 26 and CAN transmission buffer 27 by the bus 33.

The FlexRay scheduler circuit 23 is connected with the FlexRay buffer 26 by the bus 34 and the CAN scheduler circuit 24 is connected with the CAN transmission buffer 27 by the bus 35. The register setting circuit 25 is connected with the FlexRay transmission buffer 26, CAN transmission buffer 27, and memory interface circuit 42 of the routing circuit 29 by the bus 36.

The CPU 16 can write values of the FlexRay transmission buffer 26, CAN transmission buffer 27 and map memory 42 from the register setting circuit 25 through the bus 15 and bus interface circuit 20.

The various circuits will now be described using FIG. 5 with reference to FIG. 6. The received data (storage) processing circuit 21 receives and stores FlexRay frame data. As shown in FIG. 6, the specification of FlexRay prescribes communication cycles from Cycle0 to Cycle63. In the respective cycles Cycle0 to 63, time slots from time slot Slot1 to Slotm are allocated to each node, and finally NIF (network idle time) is provided to separate each cycle.

In the FlexRay frame format of each of these time slots, a data section (payload segment) of data 1, data 2, . . . follows a header segment including for example the FlexRay ID (ID allocated to the node of the FlexRay bus) and the data length of the payload, and the frame format terminates with a trailer segment including a CRC (cyclic redundancy code).

Next, the CAN data (storage) processing circuit 22 receives and stores CAN frame data. As shown in FIG. 6, the CAN frame format is constituted by the CAN ID (ID allocated to the node of the CAN bus), data length (DLC), and one or more 8-byte data units. The routing circuit 29 retrieves the transmission address from the FlexRay received data and, if the address is FlexRay, stores the data in the FlexRay transmission buffer 26. Also, if the address is CAN, the routing circuit 29 attaches the CAN ID of the address to the data and stores the data in the CAN transmission buffer (FIFO) 27. Also, the routing circuit 29 retrieves the transmission address from the CAN received data and, if the address is FlexRay, attaches the FlexRay ID to the data, and stores the data in the FlexRay transmission buffer 26. Also, if the address is CAN, the routing circuit 29 stores the data in the CAN transmission buffer (FIFO) 27.

The FlexRay scheduler circuit 23, in accordance with the FlexRay time-triggered schedule, extracts data from the FlexRay transmission buffer 26 and sets this data in the FlexRay controller 10. The CAN scheduler circuit 24, in accordance with the CAN event-triggered schedule, extracts data from the CAN transmission buffer 27 and sets this data in the CAN controller 12-1.

The status detection circuit 28 detects the FlexRay and CAN bus status (for example, reception not yet completed, in progress, and CAN bus heavy load) and executes fail-safe processing.

In this way, since routing between different communication protocols, protocol conversion and scheduling are implemented by hardware, conversion delay can be prevented, and high transmission rates can be effectively utilized. In particular, the CPU 16 can perform synchronization monitoring, error monitoring and error processing resulting from the differences of the FlexRay and CAN communication protocols with a priority.

Also, even in the case of conversion processing or routing processing, even if the number of FlexRay or CAN channels is increased, channel retrieval at the relay destination can be achieved at high speed, so time delays in routing processing can be prevented. Furthermore, even if the number of frames that are to be subjected to conversion processing is increased, this entails no increase in the latency time within the conversion device, thereby making it possible to prevent lowering of throughput and avoiding the need for a large capacity buffer memory.

—Routing Circuit—

Figure 7:
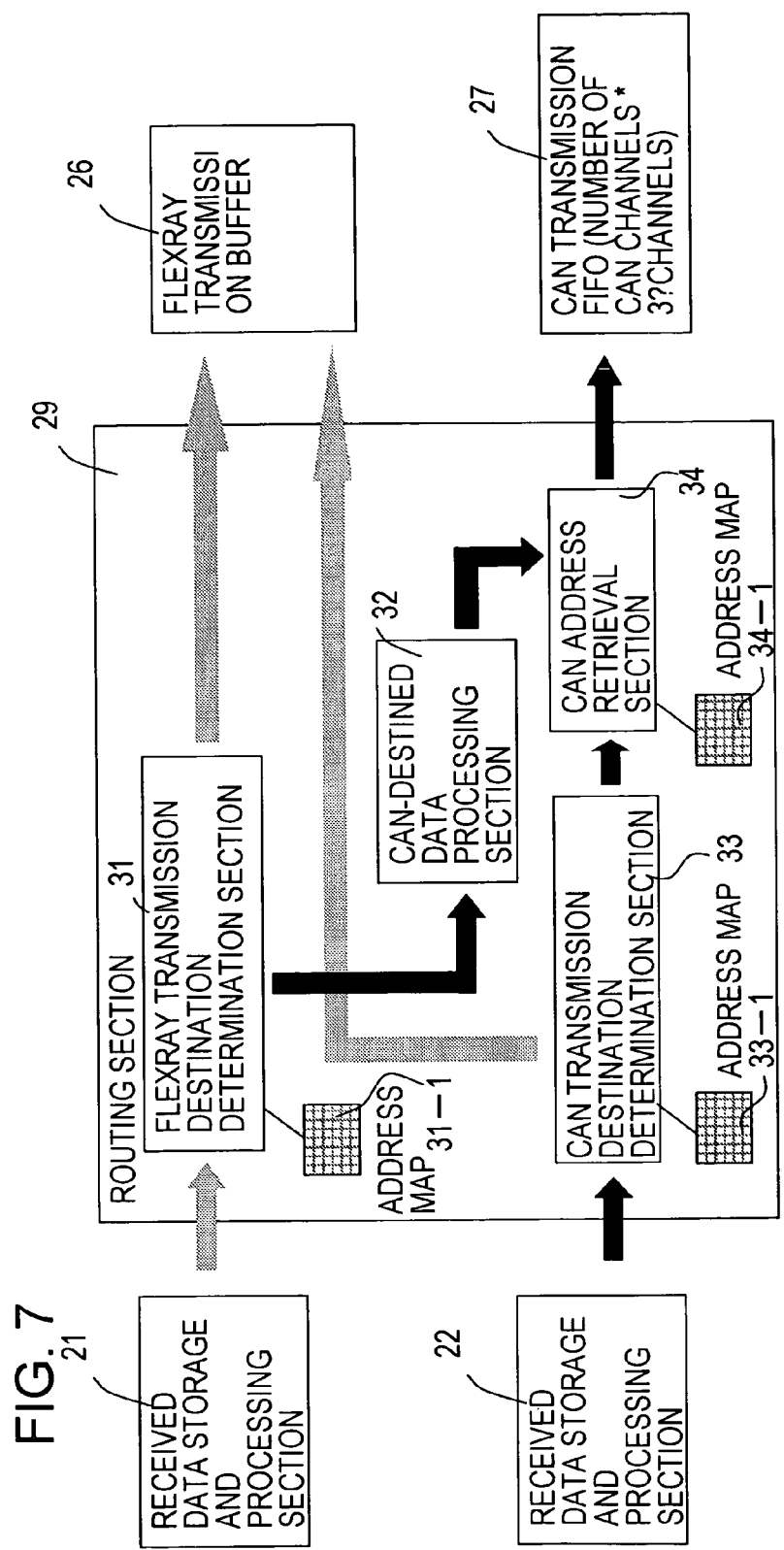
FIG. 7 is a constructional diagram of the routing unit of FIG. 4.
Figure 11:
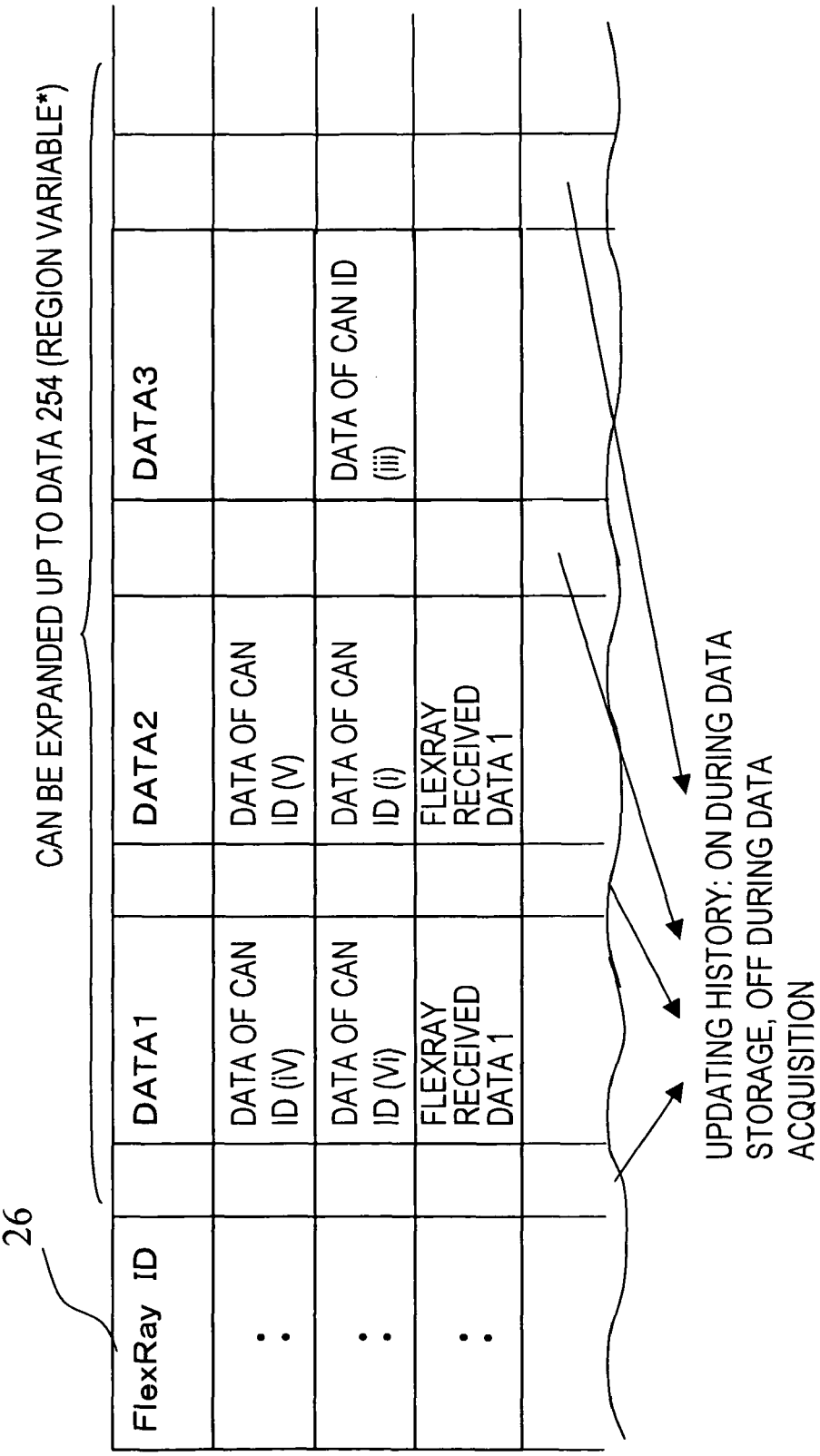
FIG. 11 is a diagram of the FlexRay transmission buffer of FIG. 7.

FIG. 7 is a layout diagram of the routing circuit of FIG. 4 and FIG. 5, FIG. 8 is a diagram of an address map memory for the FlexRay of FIG. 7, FIG. 9 is a diagram of an address map memory for the CAN of FIG. 7, FIG. 10 is a diagram of the transmission control map memory for CAN, and FIG. 11 is a diagram of the FlexRay transmission buffer.

As shown in FIG. 7, the routing circuit 29 includes: a transmission address determining circuit 31 for FlexRay, a data processing circuit 32 for data destined for CAN, a transmission address determining circuit 33 for CAN, and CAN address retrieval circuit 34.

The transmission address determining circuit 31 for FlexRay determines whether the FlexRay received data is "FlexRay-destined", "broadcast", or "CAN-destined, by referring to the FlexRay address map memory 31-1.

When the circuit 31 determines that the FlexRay received data is "FlexRay-destined" or "broadcast" by referring to the FlexRay address map memory 31-1, the circuit 31 stores the data in the FlexRay transmission buffer 26 and, if the FlexRay received data is "CAN-destined" or "broadcast", the circuit 31 transfers this data to the data processing circuit 32 for data destined for CAN.

As shown in FIG. 8, the FlexRay address map memory 31-1 used for this purpose stores a data set of whether or not a FlexRay transmission destination and CAN transmission are available in respect of each FlexRay ID (see FIG. 6) and the previously designated transmission address CAN ID (see FIG. 6). The transmission address CAN IDs can be expanded to a maximum of 256 addresses: essentially, one or more can be designated as required.

Also, the data set of whether or not a FlexRay transmission destination and CAN transmission are available is constituted by 8 bits: the FlexRay transmission destination (address) is indicated by the first six bits, and "FlexRay-destined", "CAN-destined" or "broadcast" are indicated by the remaining two bits. In this FlexRay transmission destination, "00" indicates "ID invalid", "01" indicates "FlexRay CH1", "10" indicates "FlexRay CH2", and "100" indicates "FlexRay CH3". Also, in the remaining two bits, "00" indicates that this FlexRay ID column is invalid, "01" indicates "FlexRay-destined", "10" indicates "CAN-destined" and "11" indicates "broadcast".

Consequently, the transmission address determining circuit 31 for FlexRay refers the FlexRay address map memory 31-1 using the FlexRay ID of the FlexRay frame data (see FIG. 6) of the received data storage processing circuit 21. the circuit 31, if the remaining two bits of the data set of whether or not a FlexRay transmission destination and CAN transmission are available indicate "FlexRay-destined", writes the received FlexRay frame data in the region of the FlexRay address of the transmission buffer 26 for FlexRay (to be described later).

Likewise, the transmission destination determining circuit 31 for FlexRay refers the FlexRay address map memory 31-1 using the FlexRay ID. And the circuit 31, if the remaining two bits of the data set of whether or not a FlexRay transmission destination and CAN transmission are available indicate "CAN-destined", transfers the received FlexRay frame data to the CAN data processing circuit 32, attaching the CAN ID of the CAN ID column thereto.

Likewise, the transmission address determining circuit 31 for FlexRay refers the FlexRay address map memory 31-1 using the FlexRay ID. And the circuit 31, if the remaining two bits of the data set of whether or not a FlexRay transmission destination and CAN transmission are available indicate "broadcast", writes the received FlexRay frame data in the region of the FlexRay address of the transmission buffer 26 for FlexRay (to be described) and transfers the received FlexRay frame data to the CAN data processing circuit 32, attaching the CAN ID of the CAN ID column thereto.

Next, the transmission address determining circuit 33 for CAN decides whether CAN received data is "FlexRay-destined", "broadcast", or "CAN-destined", by referencing the CAN address map memory 33-1.

If the transmission address determining circuit 33 for CAN, by referencing the CAN address map memory 33-1, determines that the CAN received data is "FlexRay-destined", or "broadcast", the circuit 33 stores this data in the FlexRay transmission buffer 26; if the CAN received data is "CAN-destined" or "broadcast", the circuit 33 stores this data in the CAN address retrieval circuit 34.

As shown in FIG. 9, the CAN address map memory 33-1 used for this purpose, in respect of each CAN ID (see FIG. 6), stores a data set of whether or not FlexRay transmission or CAN transmission is available, the FlexRay address data group, and a FlexRay transmission buffer address that has been designated beforehand.

As shown in the FlexRay transmission buffer 26 of FIG. 11, an address (location) for storing the CAN ID data is specified beforehand for each FlexRay ID. Of course, for example for purposes of FlexRay broadcasting, an address (location) is also provided that stores FlexRay received data under the FlexRay ID. An updating history is also provided indicating the history as to whether the data at this data location has been updated or not. The updating history is updated as "on" when the data is written and is updated as "off" after data has been set in the transmission buffer 26 by the FlexRay controller 10. The FlexRay transmission buffer address of the CAN address map memory 33-1 referred to above is the data storage location designated by the CAN ID of FIG. 11.

Also, the data set of whether or not FlexRay transmission and CAN transmission and a FlexRay address are available is constituted by eight bits: the FlexRay transmission destination (address) is indicated by the first six bits, and "FlexRay-destined", "CAN-destined" or "broadcast" are indicated by the remaining two bits. In this FlexRay transmission destination, "00" indicates "ID invalid", "01" indicates "FlexRay CH1", "10" indicates "FlexRay CH2", and "100" indicates "FlexRay CH3". Also, in the remaining two bits, "00" indicates that this FlexRay ID column is invalid, "01" indicates "FlexRay-destined", "10" indicates "CAN-destined" and "100" indicates "broadcast".

Consequently, the transmission address determining circuit 33 for CAN refers the CAN address map memory 33-1 using the CAN ID of the CAN frame data (see FIG. 6) of the received data storage processing circuit 22, and the circuit 33, if the remaining two bits of the data set of whether or not a transmission destination and transmission are available indicate "FlexRay-destined", writes the received CAN frame data in the region of the FlexRay transmission buffer address of the FlexRay transmission buffer 26 (FIG. 11) and updates updating history.

Likewise, the transmission destination determining circuit 33 for CAN refers the CAN address map memory 33-1 using the CAN ID, and the circuit 33, if the remaining two bits of the data set of whether or not a transmission destination and transmission are available indicate "CAN-destined", transfers the received CAN frame data to the CAN address retrieval circuit 34.

Likewise, the transmission address determining circuit 33 for CAN refers the CAN address map memory 33-1 using the CAN ID, and the circuit 33, if the remaining two bits of the data set of whether or not a transmission destination and transmission are available indicate "broadcast", writes the received CAN frame data in the region of the FlexRay transmission buffer address of the FlexRay transmission buffer 26 (FIG. 11) and transfers the received CAN frame data to the CAN address retrieval circuit 34.

The CAN data processing circuit 32, from the received FlexRay frame data and CAN ID sent from the FlexRay transmission address determination circuit 31, determines whether or not division for CAN purposes is necessary; if division for CAN purposes is necessary, the CAN data processing circuit 32 creates CAN data (see FIG. 6) by performing such division and attaches a CAN ID. Also, if no such division is necessary, the CAN data processing circuit 32 creates CAN data (see FIG. 6) with CAN ID attached, from the received FlexRay frame data and CAN ID.

Next, the CAN address retrieval circuit 34, by referencing the CAN address information map memory 34-1 under the CAN ID of the delivered CAN data, retrieves the CAN channel of the transmission destination, and transfers the CAN data to the CAN transmission buffer (FIFO) 27 with the transmission interval specified in the map memory 34-1.

As shown in FIG. 10, the CAN address information map memory 34-1 that is used for this purpose stores, in respect of each CAN ID (see FIG. 6), the fixed period transmission interval, whether decimation transmission is available or not, the number of times of decimation, the decimation time, whether or not the availability of decimation transmission depends on the bus load, the CAN channel number and address in the CAN transmission buffer.

Various types of device may be connected with the CAN bus; of these devices, some devices, such as FlexRay devices, employ a periodic data transfer system, in which, even if data were to be sent thereto, this would be ineffective, and there are also devices to which data must be sent, and devices that can wait for a prescribed time. Consequently, for each device designated by a CAN ID, it is made possible to specify the transmission interval (time interval), the availability of decimation transmission, the decimation interval (number of times), and the decimation time, and, depending on the importance of the device, it is arranged to be possible set the availability of decimation transmission depending on the bus load.

In addition, the CAN address retrieval circuit 34 searches for a CAN channel by this CAN ID and writes the CAN data (transfers the data) to the corresponding CAN transmission buffer address, attaching thereto transmission control information such as the transmission interval or decimation information referred to above.

In this way, since the routing circuit 29 is constituted by hardware, high-speed routing or data division and data conversion become possible, and detailed processing such as decimation can easily be implemented.

—Scheduler Circuits—

Figure 12:
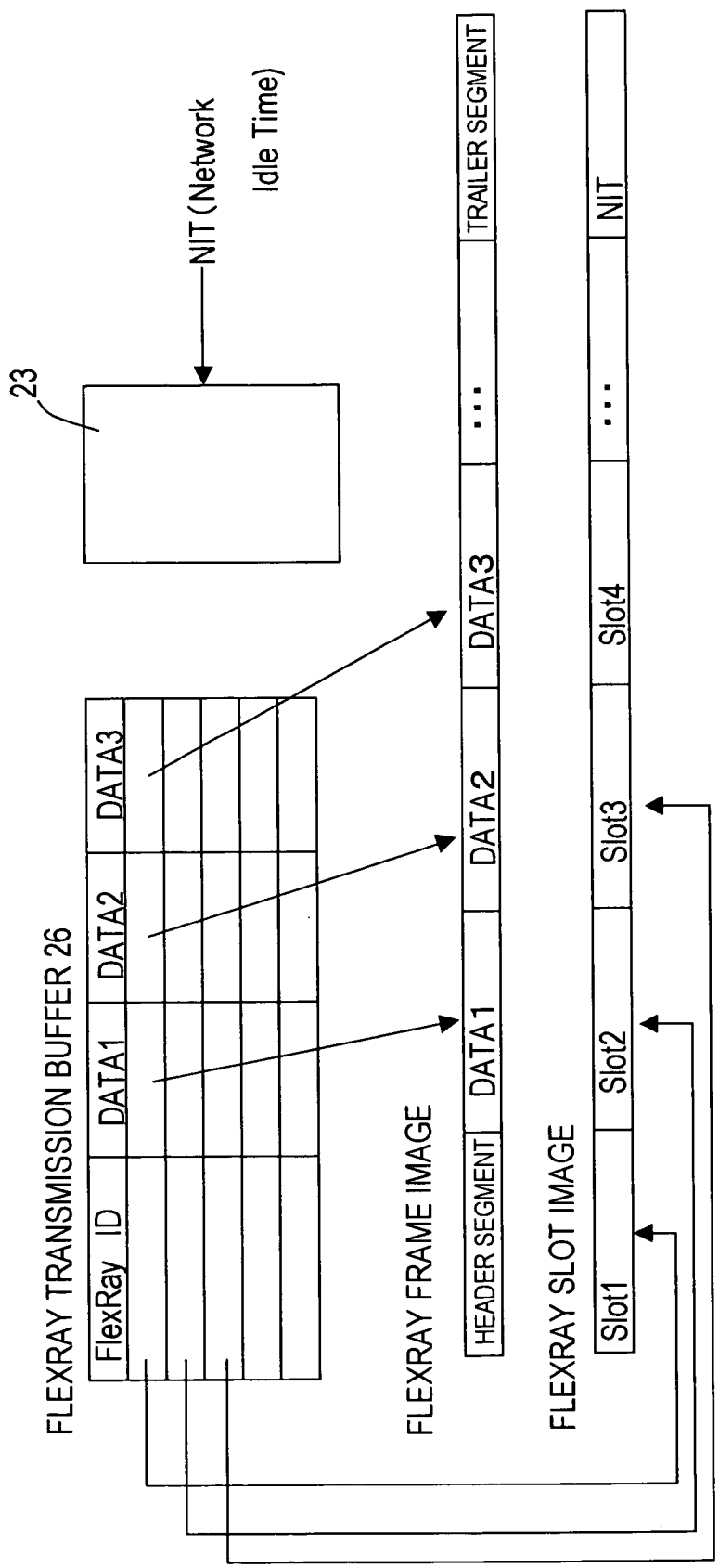
FIG. 12 is a diagram of the FlexRay scheduling circuit of FIG. 5.

Next, the scheduler circuits 23, 24 of FIG. 4 and FIG. 5 will be described with reference to FIG. 12 and FIG. 13. FIG. 12 is a diagram of a scheduler circuit 23 for FlexRay. As shown in FIG. 12, the scheduler circuit 23 for FlexRay reads data from the FlexRay transmission buffer 26 and transfers the data to the FlexRay controller 10 in accordance with the FlexRay schedule.

Specifically, the FlexRay scheduler circuit 23 detects the NIT (see FIG. 6) from the FlexRay controller 10, executes scheduling internally, and successively reads the data: DATA1, DATA2, DATA3 of the FlexRay ID of the FlexRay transmission buffer 26 corresponding to each slot, and transfers the data to the FlexRay controller 10.

Figure 13:
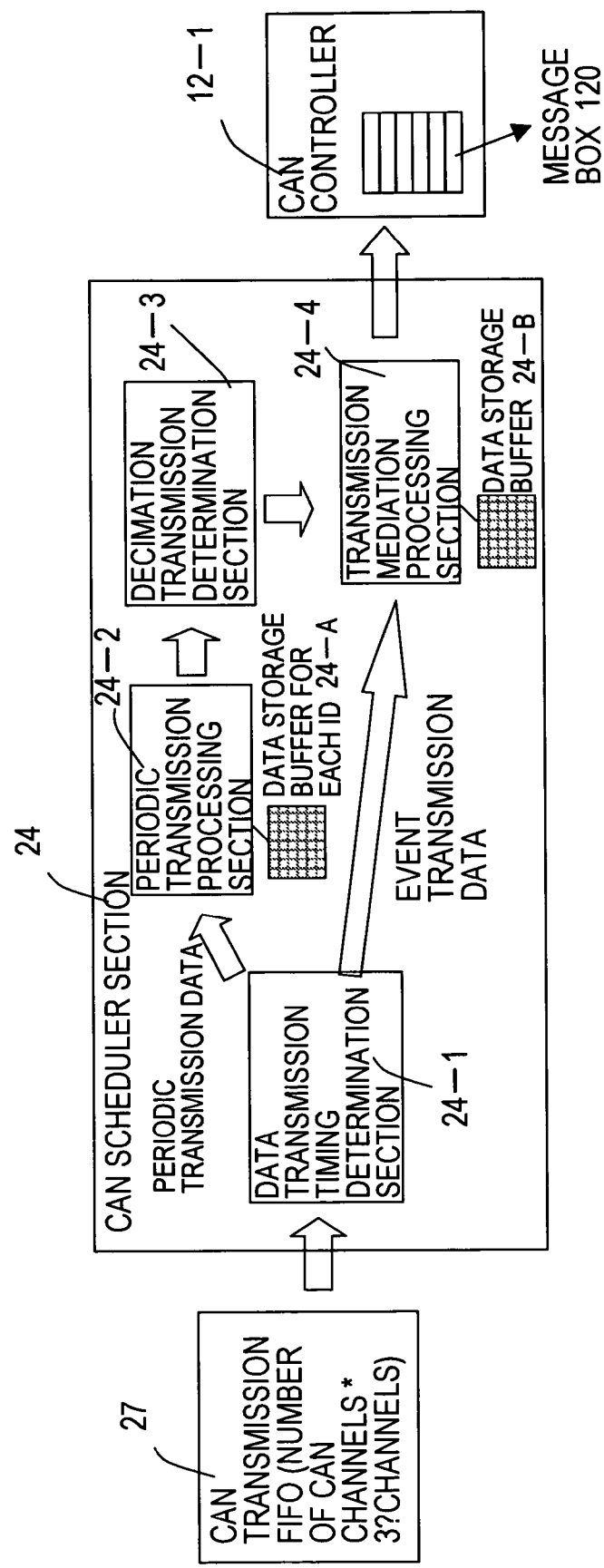
FIG. 13 is a diagram of the CAN scheduling circuit of FIG. 5.

Next, FIG. 13 is a layout diagram of a CAN scheduler circuit 24. The CAN scheduler circuit 24 has a data transfer timing determination circuit 24-1, periodic transmission processing circuit 24-2, decimation transmission determination circuit 24-3 and transmission mediation processing circuit 24-4.

The data transmission timing determination circuit 24-1 checks whether data is stored in the CAN transmission buffer (FIFO) 27. It should be noted that the CAN transmission buffer 27 is provided with a register that specifies for each channel whether automatic transmission is available, and event/periodic transmission.

The data transmission timing determination circuit 24-1 reads data which is stored in the CAN transmission buffer 27 and is set an automatic transmission of data in the CAN transmission FIFO (channel) 27, and, depending on whether the setting is event or fixed period, distributes the data to the fixed period transmission processing circuit 24-2 or transmission arbitration processing circuit 24-4 and stores the data in the data storage buffer 24-A or 24-B.

The fixed period transmission processing circuit 24-2 transmits the CAN data of the data storage buffer 24-A to the decimation transmission processing circuit 24-3, with a transmission interval (see FIG. 10) attached the storage data (CAN data) of the data storage buffer 24-A.

The decimation transmission processing circuit 24-3 checks the decimation information (see FIG. 10) of the CAN data, and, if decimation is turned on, performs decimation processing in accordance with for example the number of times of decimation and decimation time, and stores the results of this decimation processing in the data storage buffer 24-B of the transmission arbitration processing circuit 24-4. Also, the decimation transmission processing circuit 24-3, in the case of bus load-dependent decimation from the CAN data decimation information (see FIG. 10), checks whether the bus load has reached the set value, and, if this set value has been reached, performs decimation processing, and stores the data in the data storage buffer 24-B of the transmission arbitration processing circuit 24-4.

The transmission arbitration processing circuit 24-4 transmits the CAN data of the data storage buffer 24-B to the CAN controller 12-1. Also, the transmission arbitration processing circuit 24-4, if the data storage buffer 24-B is free, transfers the data to the CAN controller 12-1 with the timing with which the CAN data were stored. And, if there is no space in the message box 120 of the CAN control 12-1 (i.e. if the message box is full), the circuit 24-4 reads the CAN data from the data storage buffer 24-B with the CAN transmission completion interrupt obtained from the CAN controller 12-1, and transfers this data to the CAN controller 12-1.

In this way, the scheduling operation also can be implemented individually and in conformance with the protocol.

—Flexray/CAN Conversion CAN Frame Processing—

Figure 14:
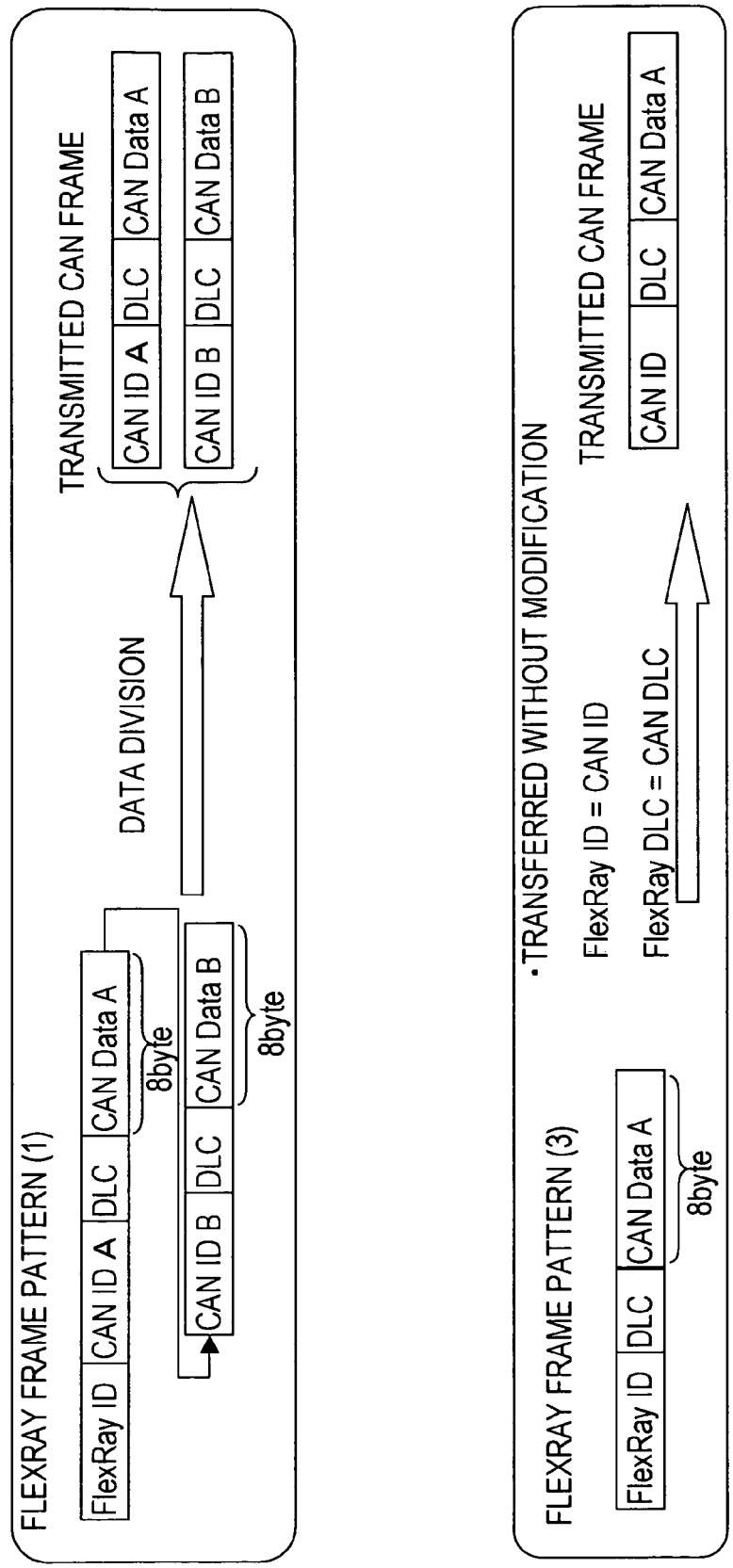
FIG. 14 is a first diagram of a FlexRay frame pattern suitable for message conversion in FIG. 1.
Figure 15:
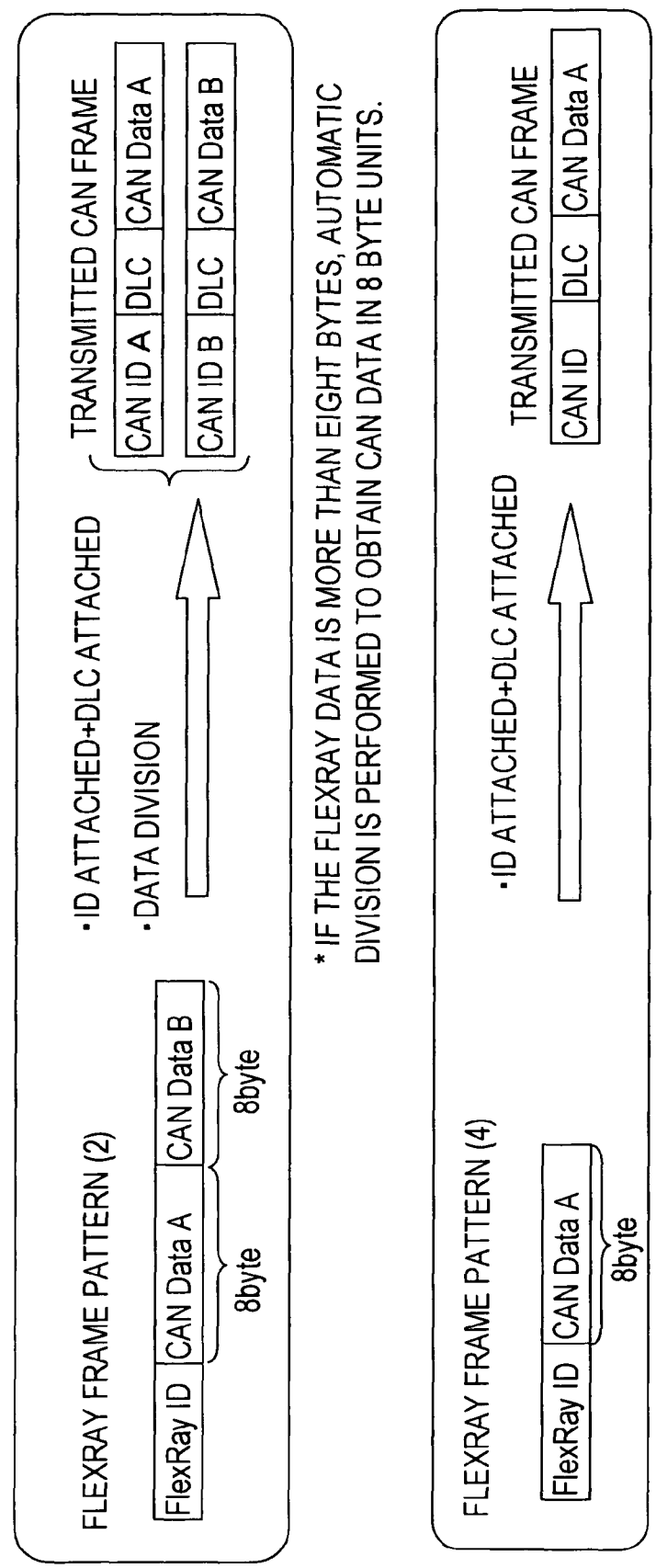
FIG. 15 is a second diagram of a FlexRay frame pattern suitable for message conversion in FIG. 1.

FIG. 14 and FIG. 15 are diagrams of data frames that are suitable for FlexRay/CAN conversion. As described with reference to FIG. 6, in FlexRay, the format of the slots or frames is specified, but a suitable frame format for conversion has not been proposed.

It is now therefore described a FlexRay data frame which enables existing CAN assets to be employed and which provides an efficient gateway to CAN.

FIG. 14 shows how a FlexRay frame pattern is converted to a FlexRay ID, CAN ID, DLC (data length) and CANDATA format. In the case of the FlexRay frame format (1), a transmission CAN frame can be created simply by data division, since the CAN ID is attached in front of the FlexRay frame DATA. Specifically, efficient conversion can be achieved since the amount of processing performed by the FlexRay transmission address determination section 31 of FIG. 7 is reduced.

In the case of the FlexRay format (3), the FlexRay ID is made the same as the CAN ID, and the FlexRay DLC and CAN DLC are made the same, so transfer can be directly effective. Specifically, efficient conversion can be achieved since the amount of processing performed by the FlexRay transmission address determination section 31 of FIG. 7 and the CAN data processing circuit 32 is reduced.

FIG. 15 shows how the FlexRay frame pattern is converted to a format of FlexRay ID and CAN data (8 byte). In the case of the FlexRay frame format (2), the FlexRay ID is converted to a CAN ID, and a DLC is attached, and the data is divided, so that the transmission CAN frame can be created simply. Specifically, efficient conversion can be achieved since the amount of data division processing performed by the CAN data processing circuit 32 of FIG. 7 is reduced.

In the case of the FlexRay frame format (4) too, a CAN transmission frame can be created simply by converting the FlexRay ID to a CAN ID and attaching a DLC. Specifically, efficient conversion can be achieved since the amount of data division processing performed by the CAN data processing section 32 of FIG. 7 is reduced.

FIG. 16 shows a construction for treating with these frame formats. In the present invention, this can be realized simply by altering the content of the address map memory 31-1 of the FlexRay transmission destination determination circuit 31. Specifically, in the construction of the map memory 31-1 of FIG. 7, a DLC column and a frame pattern column are attached, and the frame pattern of the FlexRay ID is recognized by unit of a 2-bit frame pattern.

Also, in the case of the FlexRay frame format pattern (1), the data processing circuit 32 may perform exclusively data division and, in the case of the FlexRay frame format patterns (2) and (4), the data processing circuit 32 may perform exclusively pasting of CAN ID and DLC. In the case of the FlexRay frame format pattern (3), the data processing circuit 32 does not need to perform processing.

Thus, when these FlexRay frame format patterns (1) to (4) are employed, conversion processing becomes even easier, and gateway latency can be prevented.

Other Embodiments

With the embodiments described above, the gateway device was described with reference to FlexRay and CAN conversion, but it would also be possible to employ this gateway device for other types of communication conversion with other communication protocols, in particular, event-triggered and time-triggered protocols. Other constructions could also be adopted for the constituents of the G/W hardware macro unit, such as for example the scheduler circuit. In addition, this gateway device could be utilized in other applications, not merely vehicle-mounted applications.

Since the scheduler circuit that performs scheduling of the communication protocol and a routing circuit are provided separately, message conversion can be achieved at high speed and without latency. Also, since the updating history is attached to time-triggered messages, a device that receives messages from the communication path can easily identify whether a message is an updated message or a previous message, even in the case of time-triggered messages. Furthermore, since the time-triggered schedule is executed triggered by network idle time, conversion processing can be performed accurately and easily in accordance with a time-triggered schedule. Yet further, since the FlexRay frame format is constructed taking into consideration conversion efficiency, FlexRay and CAN message conversion can be implemented efficiently.

What is claimed is:

1. A communication message conversion apparatus that converts a message of an event-triggered communication protocol into a message of a time-triggered communication protocol and communicates with a designated address, comprising:

reception unit that receives the message of the event-triggered communication protocol;

a transmission buffer that stores the message of the time-triggered communication protocol;

a transmission unit that transmits the message of the time-triggered communication protocol stored in the transmission buffer to a communication path with a time-triggered schedule; and a routing unit that updates the message of the time-triggered communication protocol in a designated address storage location of the transmission buffer with the received message of the event-triggered communication protocol and stores updating history which indicates whether or not the message of the time-triggered communication protocol of the designated address storage location is updated in the transmission buffer, the updating history being attached to the message of the time-triggered communication protocol, wherein the transmission unit transmits the message of the time-triggered communication protocol with the updating history attached.

2. The communication message conversion apparatus according to claim 1, the transmission unit transmits the message of the time-triggered communication protocol of the transmission buffer to the communication path with the time-triggered schedule in accordance with network idle time information of the time-triggered communication protocol.

* * * * *